A. A. BACKHAUS.
APPARATUS FOR MAKING ETHYLENE.
APPLICATION FILED DEC. 19, 1918.
1,402,336.
Patented Jan. 3, 1922.
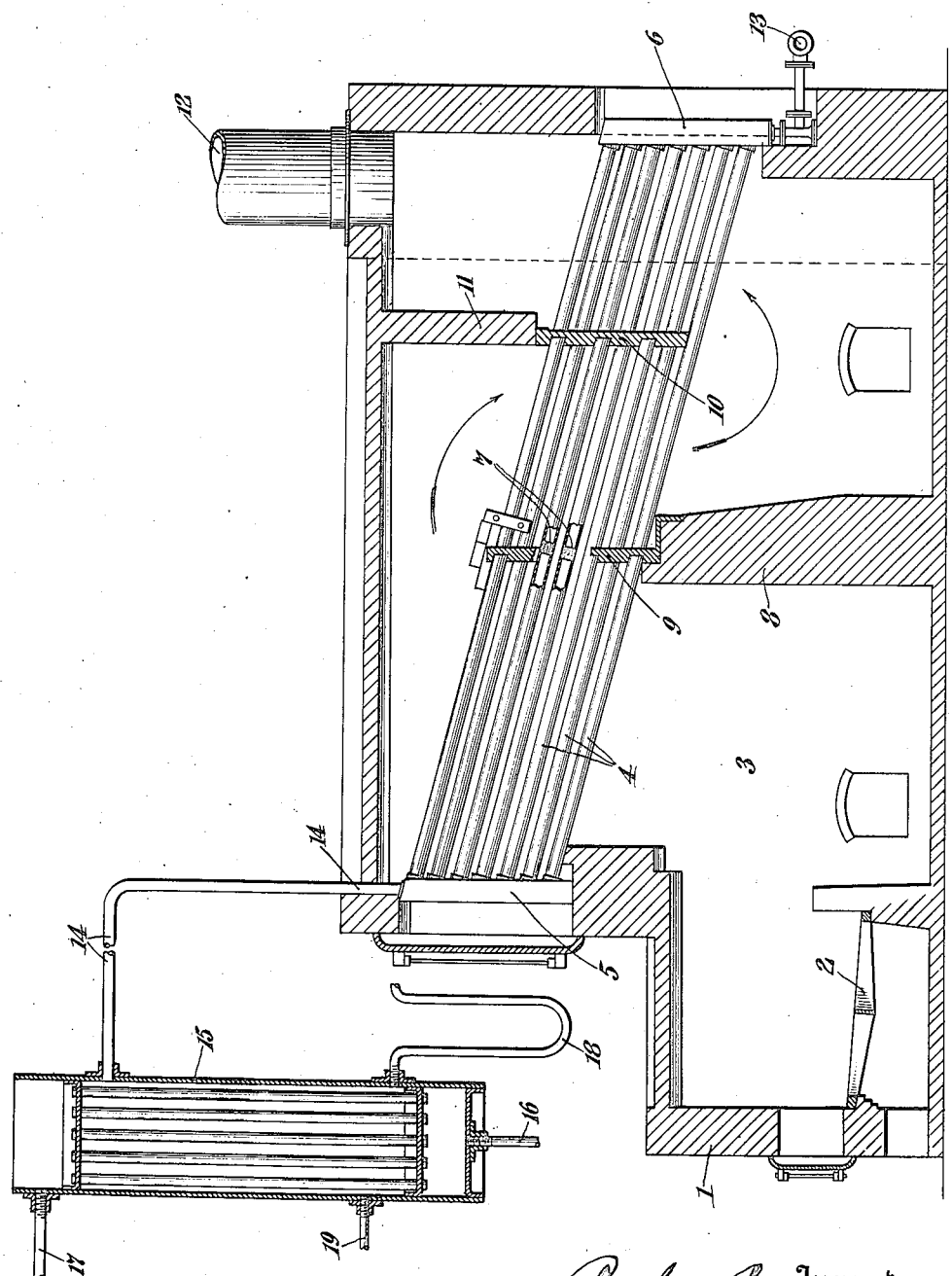

ated disks 7 to hold in place in each tube
UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

APPARATUS FOR MAKING ETHYLENE.

1,402,336.  Specification of Letters Patent.  Patented Jan. 3, 1922.

Application filed December 19, 1918. Serial No. 267,485.

*To all whom it may concern:*

Be it known that I, ARTHUR A. BACKHAUS, of Baltimore, in the State of Maryland, have invented a certain new and useful Improvement in Apparatus for Making Ethylene, and do hereby declare that the following is a full, clear, and exact description thereof.

My invention relates particularly to an apparatus for making ethylene by the use of a catalytic agent.

The object of my invention is to provide an apparatus by means of which ethylene may be made catalytically and in an expeditious and economical manner.

Another object of my invention is to provide an advantageous apparatus for making ethylene from ethyl alcohol.

Further objects of my invention will appear from the detailed description thereof contained hereinafter.

While my invention is capable of embodiment in many different forms, I have shown only one form of apparatus in the accompanying drawing, in which—

The figure is a vertical section of an apparatus which may be used in accordance with my invention.

In the drawings, I have shown a furnace 1, having a grate 2 located in a main heating chamber 3, in which the products of combustion pass upwardly into contact with a plurality of inclined tubes 4, carried by vertical headers 5 and 6 supported in the walls of the furnace in such a manner as to be accessible from the outside for removal, when desired, as for example for cleaning or replacement of parts. The tubes 4 are shown as provided at a point substantially intermediate their ends with transverse perforated disks 7 to hold in place in each tube a quantity of catalytic material in the upper ends of said tubes over the heating chamber 3. The tubes 4 are preferably inclined so as to prevent the presence of any free spaces above the bodies of catalytic material through which the gases could pass without coming into contact with said material. The catalytic material when employed as a means for producing ethylene from alcohol may be comprised of a quantity of comminuted coke or pumice stone carrying syrupy phosphoric acid ($H_3PO_4$), or instead, if desired, carrying finely divided aluminum oxide. The catalytic material is preferably made as set forth in my application upon process of producing catalytic agents, Serial No. 267,485, filed December 19, 1918, although it may be made in any other desired manner. Opposite the points in the tubes 4 where the disks 7 are located there is shown a vertically-directed wall 8, and on the top thereof a baffle plate 9, which direct products of combustion of the furnace upwardly into contact with the portions of the tubes 4 containing the catalytic material, and in such a manner that said products of combustion on passing beyond this point will pass downwardly, as shown by the arrows, into contact with the lower ends of the tubes 4 which contain the incoming alcohol vapors, so as to preheat the same. From this point the products of combustion pass, in the embodiment shown, downwardly around another baffle plate 10, which is supported by a downwardly-directed wall 11 carried by the upper portion of the furnace. Thereafter the products of combustion may pass upwardly so as to come into contact again with the tubes 4 and thus initially preheat the incoming vapors therein. The products of combustion finally pass out by means such as a stack 12. The tubes 4 are preferably fed with vapors such as ethyl alcohol by means of a pipe 13, which may be supplied with said vapors from any suitable source, as for example a still (not shown). The catalytic material in the tubes 4 changes the alcohol to ethylene, and the ethylene gases, together with water vapor, pass out of the header 5 by means of a pipe 14, which is preferably connected with a tubular condenser 15, shown as having an inlet 16 for cooling water and an outlet 17 for the effluent water, and which is provided with a trapped outlet 18 for the water condensed by the condenser. The ethylene gas passes away from the condenser by means such as a pipe 19, and may be conveyed to any desired point or collected in any suitable manner, as for example in a gasometer (not shown).

In the operation the present embodiment of my invention, vapors of ethyl alcohol are supplied by the pipe 13 to the tubes 4. These vapors are preferably obtained from an alcohol having a strength of 95%, from which I obtain much higher yields and more efficient results than from the use of an alcohol having a lower strength. These vapors are preheated in the lower portions of the tubes 4 and then come into contact with the catalytic material, which, in the case of phosphoric acid, is maintained at a temperature of approximately 300° C., or, in the case of aluminum oxide, at a temperature of approximately 400° C. The alcohol is thus acted upon so as to form ethylene gas by the removal of water from the alcohol. The ethylene gas and water vapors pass out of the furnace by means of the pipe 14 to the condenser 15, where the water vapors are condensed and removed by the trapped pipe 18, thus separating the same from the ethylene gas, which passes out from the condenser by the pipe 19 and may be recovered and used in any desired manner.

It will be understood that my apparatus may be used in other processes where catalytic action is desired.

While I have described my invention above in detail, I wish it to be understood that many changes may be made therein without departing from the spirit of the same.

I claim:

1. An apparatus for making ethylene comprising a furnace, tubes in the furnace inclined upwardly toward the fire box, permeable stops in the tubes and a phosphoric acid catalyst composition above said stops.

2. An apparatus for making ethylene comprising a furnace, tubes in the furnace inclined upwardly toward the fire box, permeable stops in the tubes and pieces of coke containing phosphoric acid catalysts above said stops.

3. An apparatus for making ethylene comprising a furnace, tubes in the furnace inclined upwardly toward the fire box, a manifold connected to an alcohol supply at the rear of the tubes, a manifold at the front of the tubes, permeable stops in the tubes containing a phosphoric acid catalyst above said stops.

4. An apparatus for making ethylene comprising a furnace having a wall with a baffle plate thereon, tubes in the furnace inclined upwardly toward the fire box, a manifold connected to an alcohol supply at the rear of the tubes, a manifold at the front of the tubes, permeable stops in the tubes, and phosphoric acid catalyst composition above said stops.

5. An apparatus for making ethylene comprising a furnace having a wall with a baffle plate thereon, tubes in the furnace inclined upwardly toward the fire box passing through said baffle, a manifold connected to an alcohol supply at the rear of the tubes, a manifold at the front of the tubes connected to a condenser, permeable stops in the tubes, and coke containing phosphoric acid catalyst above said stops.

6. An apparatus for making ethylene comprising a furnace, tubes therein inclined upwardly toward the front of the furnace, means to retain a catalyst in the upper part of the tubes, and means for admitting alcohol to the lower ends of the tubes.

In testimony that I claim the foregoing I have hereunto set my hand.

ARTHUR A. BACKHAUS.

Witnesses:
ERNEST J. WINTER,
WILLIAM WATSON.